No. 715,218. Patented Dec. 2, 1902.
H. STRACHE.
PROCESS OF GENERATING WATER GAS.
(Application filed Oct. 22, 1901.)
(No Model.)
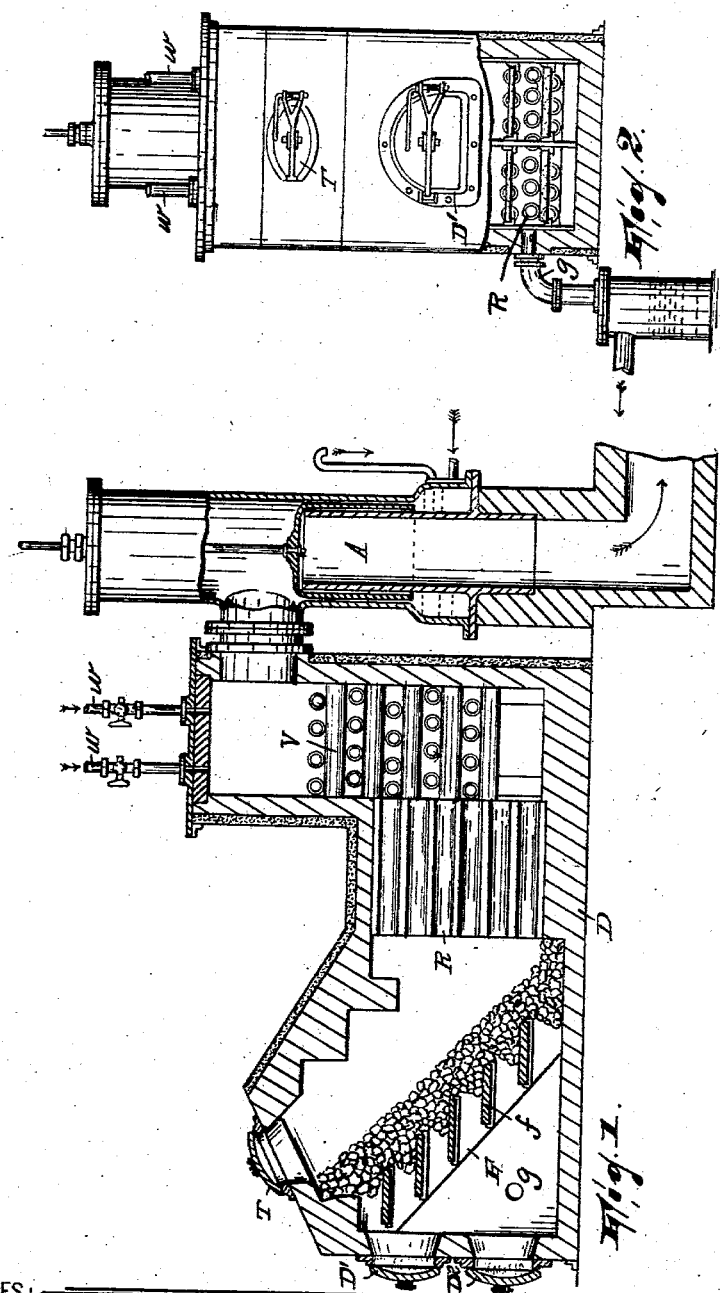
WITNESSES:
INVENTOR,
Hugo Strache,
BY
Gartner & Steward,
ATTORNEYS.

UNITED STATES PATENT OFFICE.

HUGO STRACHE, OF VIENNA, AUSTRIA-HUNGARY.

PROCESS OF GENERATING WATER-GAS.

SPECIFICATION forming part of Letters Patent No. 715,218, dated December 2, 1902.

Original application filed October 31, 1900, Serial No. 35,008. Divided and this application filed October 22, 1901. Serial No. 79,547. (No specimens.)

*To all whom it may concern:*

Be it known that I, HUGO STRACHE, chemist and manager, a subject of the Emperor of Austria-Hungary, residing at VIII Alserstrasse 49, Vienna, Austria-Hungary, have invented a certain new and useful Process of Generating Water-Gas from Any Suitable Fuel; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to the generating of water-gas; and its object is to provide an improved process whereby any suitable fuel, even such in a granular state, may be utilized for generating water-gas. While in the manufacture of water-gas from incandescent carbon and steam as heretofore generally practiced shaft-furnaces had to be used, in which the fuel was contained at a height of from three to ten feet, so that a blower or blast apparatus was required in heating the same, I employ, according to my improved process, a step-grate furnace, the fuel here being used in layers of from four to twenty inches thickness only, and the combustion of the same for heating the furnace taking place under the action of the natural draft of the chimney.

My invention therefore consists in the process or method as hereinafter more fully described.

An open or reticulated body of fire-clay (or tubes of fire-clay) situated opposite the surface of the step-grate is heated to incandescence by the gases of combustion, and the greater portion of the heat generated is thus stored away, as by a regenerator. The remaining portion of the heat of the gases of combustion is utilized for heating an evaporator, the gases of combustion finally passing into the chimney. The regulation of the fire is effected by partially opening doors below and above the grate, respectively. As soon as the fuel has become thoroughly heated to a state of incandescence and the evaporator raised to a temperature of above 100° centigrade a thin layer of fresh fuel is filled in the apparatus, whereupon the latter is hermetically closed. The newly-added fuel is immediately caused to generate gas, partly under the action of the incandescent layer of fuel below and partly by the radiation of heat from the incandescent body of fire-clay. I at the same time admit water into the evaporator, which evaporates in the latter, the steam thus generated passing the regenerator and ultimately striking the fresh fuel in a strongly-superheated condition, so as to assist in the charring or coking of the same. The products of distillation mixed with the steam then pass through the incandescent fuel on the step-grate already charred or coked previously and are here decomposed, together with the surplus quantity of steam, thus becoming transformed into water-gas. The latter escapes by way of a water seal or siphon into the conduit which communicates with the reservoir. Instead of admitting water into the evaporator I may also therein admit steam. In this case the space provided for the evaporation of the water serves for the superheating of the steam. The thorough decomposition of the steam in spite of the thin layer of fuel and the comparatively low temperature is obtained by making the area of the grate-surface very large and the quantity of water admitted during a unit of time very small, so that the speed of the steam at the grate will be small. Upon completion of the generation of gas—that is to say, upon the supply of water having been shut off—the apparatus is opened again, whereupon the heating of the same will begin anew.

In order to increase the water-gas output, a blast of air may be admitted to the apparatus at the conduit, by which the water-gas escapes during the period of heating. In this case I preferably make use of a reversing mechanism in order to avoid explosions in changing from heating to gas-generating.

The preferred form of the apparatus whereby my process is carried into effect is that shown in the accompanying drawings, wherein—

Figure 1 is a longitudinal transverse sectional view of the apparatus; and Fig. 2 is an end view, a portion of the apparatus being broken away to show the interior thereof.

D is the furnace, having the usual fuel-supply door T in the top thereof and draft-controlling door D' and D² in one wall thereof. Opposite the last-named wall is arranged an inclined grate F, consisting of a series of plates forming grate-bars $f$, which are arranged in step-like disposition. On this grate the fuel is adapted to be placed, being supplied through the door T, which is disposed at the upper end of said grate. On the fuel side of the grate and substantially in the same plane therewith is arranged a reticulated body R, which may be formed of tubes of fire-clay open at both ends and lying horizontally with one end adjacent the grate. Beyond this body of fire-clay is arranged an evaporator V, consisting of pieces of cast-iron, preferably of tubular shape, and still beyond that, but outside of the furnace proper, is a liquid-seal valve A, which is adapted to be opened between the gas-producing stages of the operation and closed during these stages.

$w$ $w$ are valved pipes by which the water or, if desired, steam is adapted to be introduced into the furnace.

The small opening $g$ under the grate is the opening through which the water-gas is permitted to pass to the reservoir therefor.

What I claim as my invention, and desire to secure by Letters Patent, is—

The method generating water-gas which consists in first disposing the fuel in a layer having relatively great breadth and little thickness, secondly, igniting said fuel and using a portion of the heat generated thereby to heat a heat-storer, third, depositing a fresh supply of fuel in a thin layer on the first layer of fuel as a support for said fresh layer of fuel and effecting the distillation of said fresh layer of fuel by the heat from said first layer of fuel and from the heat-storer and simultaneously bringing together a body of water and another portion of the heat from said ignited fuel so as to evaporate the water, fourth, conducting the vapor generated into operative contiguity to the heat-storer so as to superheat the vapor, and, fifth and finally, conducting the thus-superheated vapor through the layers of fuel, substantially as described.

In testimony that I claim the foregoing I have hereunto set my hand this 9th day of October, 1901.

HUGO STRACHE.

Witnesses:
ALVESTO S. HOGUE,
AUGUST FUGGER.